United States Patent [19]

Wolf et al.

[11] Patent Number: 4,887,801
[45] Date of Patent: Dec. 19, 1989

[54] HYDRAULICALLY DAMPED ELASTOMER-METAL BEARING

[75] Inventors: Franz J. Wolf; Hubert Pletsch, both of Bad Soden-Salmünster, Fed. Rep. of Germany

[73] Assignee: WOCO Franz-Josef Wolf & Co., Fed. Rep. of Germany

[21] Appl. No.: 265,897

[22] Filed: Nov. 2, 1988

[30] Foreign Application Priority Data

Nov. 3, 1987 [DE] Fed. Rep. of Germany ....... 3737252

[51] Int. Cl.⁴ .............................................. F16F 5/00
[52] U.S. Cl. .................................. 267/140.1; 267/219
[58] Field of Search ................. 248/562; 267/140.1 R, 267/140.1 A, 219, 220

[56] References Cited

U.S. PATENT DOCUMENTS

| | | | |
|---|---|---|---|
| 4,422,779 | 12/1983 | Hamaekers et al. | 267/140.1 X |
| 4,511,126 | 4/1985 | Bernuchon et al. | 267/140.1 |
| 4,681,306 | 7/1987 | Hofmann et al. | 267/140.1 |
| 4,697,793 | 10/1987 | Reuter et al. | 267/140.1 X |
| 4,733,854 | 3/1988 | Miyamoto | 267/140.1 |
| 4,796,876 | 1/1989 | Sciortino | 267/140.1 |

Primary Examiner—Duane A. Reger
Attorney, Agent, or Firm—Burns, Doane, Swecker & Mathis

[57] ABSTRACT

The hydraulically damped elastomer-metal bearing comprises a bell-type housing two rigidly connected truncated conical support springs, which are located in the housing and which are oriented in the same direction. Between the two support springs, a disc-type separating element is fixed in a liquid-tighten manner such that above that disc-type separating element a second working chamber containing a damping liquid is defined, which is activated when the bearing is unloaded, while below the disc-type separating element a first working chamber is defined, from which the hydraulic liquid is pressed back to the second working chamber when the bearing is compressed by the load to be supported. Two entirely hydraulically independent throttling channels are formed in the disc-type separating element, which throttling channels can be closed by back valves, whose working direction is oppositely directed. Thus each of the two independent channels is passed by the pressurized damping liquid in one flow direction only.

20 Claims, 1 Drawing Sheet 4,887,801

HYDRAULICALLY DAMPED ELASTOMER-METAL BEARING

BACKGROUND OF THE INVENTION

The present invention relates to a bearing, and more particularly to a hydraulically damped elastomer-metal bearing.

Hydraulically damped elastomer-metal bearings, especially those used for engine or drive assembly suspension purposes in motor vehicle construction, are known in many variations.

Typically, such hydraulically damped elastomer-metal bearings consist of a first load coupling element for the load to be supported, a second load coupling element opposite to the first for fixing the bearing for example to a chassis and a truncated conically-shaped support spring, which is positioned inside a hollow working chamber filled with a damping liquid, which working chamber is separated by a disc-type separating element arranged transversely to the vector of the load to be supported.

When such a hydraulically damped elastomer-metal bearing according to the state of the art is compressed, the damping liquid is pressed out of the working chamber through a throttling channel formed in the disc-type separating element into a receiving or compensation chamber at the other side of the disc-type throttling or separating element. The kinetic energy dissipated in the throttling channels corresponds to the damping factor of the bearing.

These bearings comprise a certain overpressure in the working chamber, when the bearing is compressed and a certain under-pressure when the bearing is unloaded. This means that, when the bearing is unloaded, the damping liquid is sucked from the compensation chamber back to the working chamber.

Especially when having larger amplitudes or certain critical frequencies, the acoustic damping facilities as well as the vibration damping facilities of such hydraulically damped bearings are deteriorated by cavitation effects occurring inside the throttling channels formed in the disc-type separating element. During these working conditions, the bearing shows a disturbing noise and spring and damping characteristics, which are adulterated by foaming effects connected originally to the cavitation effects.

OBJECTS AND SUMMARY OF THE INVENTION

Based on this state of the art, it is an object of the present invention to improve a hydraulically damped elastomer-metal bearing according to the state of the art such that cavitation effects are prevented or even excluded and such that the acoustic damping facilities are improved on the one hand by preventing cavitation effects and foaming effects and, on the other hand, by an improved insulation with respect to each other of the body-transmitted acoustic waves transmitting parts of the bearing.

Accordingly, the hydraulically damped bearing according to the present invention is characterized by two working chambers which are stacked with respect to the longitudinal axis of the bearing at both sides of the disc-type separating element. In contrast to a hydraulically damped bearing according to the state of the art, in which the damping liquid is sucked from a compensation chamber back to the only working chamber when the bearing is unloaded, in a bearing according to the present invention, the damping liquid is pressed under a certain overpressure through the throttling channels into the opposite working chamber at the other side of the disc-type separating element when the bearing is compressed as well as when the bearing is unloaded.

According to the second characteristic feature of the present invention, the above mentioned optimum condition for suppressing cavitation effects is consequently utilized by the fact that two throttling channels, which are entirely independent from each other, are formed in the disc-type separating element, whereat each of the throttling channels allows a flow of the damping liquid in one and the same direction only, when the damping liquid is pressurized. This is achieved in a simpliest way by back valves or back flaps, which are arranged at both throttling channels formed in the disc-type separating element and which each allow the flow of the damping liquid in an opposite direction. In other words, there is formed a first throttling channel, which comprises one or two back valves which open when under load damping liquid is pressed out of a first throttling chamber into a second throttling chamber, whereat the back valve valves are closed when the second working chamber is pressurized when the bearing is unloaded. At the same time, when the bearing is unloaded and the second working chamber is pressurized, the damping liquid inside this second working chamber is pressed through a second throttling channel formed in the disc-type separating element back to the first working chamber. This second throttling channel comprises one or two back valves, too, which open when the bearing is unloaded and close when the bearing is compressed.

This means that each of the throttling channels formed separately with one input and one output opening for each of the channels is passed only in one and the same direction by the damping liquid every time when the bearing is compressed or unloaded, respectively.

According to a special embodiment of the present invention, both elastomer support springs, each of them enclosing one of the working chambers, are connected preferably centrally and axially by a rigid coupling element. In that area where this rigid coupling element intersects the disc-type separating element, the coupling element is enclosed in a liquid-tighten manner by an elastomer diaphragm, the outer edge of which diaphragm is fixed in a liquid-tight, too, inside an opening in the disc-type separating element.

The valves controlling the liquid flow through the throttling channels formed in the disc-type separating elements may be principally of any type. Preferably, they are formed as leaf spring elements which cover the input and/or output openings of the throttling channels. These leaf spring elements may be made of spring steel or plastics or, for example, an elastomer material. Furthermore, the valves may be formed by single leaf springs or by groups of leaf springs. Particularly, the construction of the back valves by groups of leaf springs enables not only the closing force of the valve to be controlled, but the throttling characteristics of the channel, too.

By the arrangement of two entirely separated throttling channels each of them passed only in one and the same direction by the pressurized damping liquid, practically unlimited variations with respect to the damping facilities of the bearing according to the present invention in the direction of the load to be supported as well as in the opposite direction can be achieved. Additionally, the damping facilities in both directions can be predetermined and controlled differently. In this simple way, for example, a bearing can be achieved which is compressed by the load to be supported nearly undamped and which moves back highly damped. Such damping characteristics are highly wanted for numerous suspension and bearing purposes in motor vehicle construction and provide many new possibilities for improving the driving comfort of a motor vehicle.

For realizing the above mentioned damping characteristics, the channel through which the damping liquid is passed, when the bearing is compressed, from the first working chamber to the second working chamber may be, for example, a relatively large opening with a back valve, which comprises nearly no flow resistance to the damping liquid in a forward direction, while the channel formed in the disc-type separating element for passing the damping liquid back from the second working chamber to the first working chamber is a throttling channel with a comparably highly prestressed back valve spring and/or is formed to be highly throttling which may be, for example, a long and/or more or less highly curved channel.

For improving the acoustic characteristics, the bearing is at least partially and preferably totally coated with an elastomer layer inside. Particularly, the disc-type separating element is fixed at its peripheral edge to the metal housing by embedding this peripheral edge in an elastomer coating layer, whose thickness is selected according to the amount of acoustic desired damping. The thickness of this coating layer according to the special requirements may be predetermined without any problems by a person skilled in the art.

According to another special embodiment of the present invention, the disc-type separating element, which may be made normally by injection molding or pressure molding, comprises two separate parts, which parts are separated from each other along a separating area, which extends in the middle of the disc-type separating element or, in other words, in its main plain. The throttling channels in the disc-type separating element are formed in each of the two parts of the disc-type separating element as mutually complementary recesses, such as for example annular grooves, which recesses form together the radially closed throttling channel when the two parts of the disc-type separating element are connected. In this special embodiment of the disc-type throttling element, the lengths of the channels the associated throttling effect of the channels may be varied according to the special requirements by angularly twisting the two parts of the disc-type separating element relative to each other. Afterwards, the two parts may be bonded adhesively, welded or fixed in any way. Alternatively, the connection between the two parts may be removable according to the special requirements for such bearings.

As described above, this modular and selective design can be realized for the valves controlling the flow of the damping liquid through the throttling channels, too, such that the whole bearing can be adjusted with respect to its damping characteristics very easily according to a broad range of requirements.

When a bearing according to the present invention has to be mounted obliquely or when such a bearing is undergoing loads not acting exactly axially, one or preferably both of the elastomer support springs are weakened by recesses of principally any possible shape for distributing the loads and tensions in the damping system more uniformly. These recesses are localized such that the areas of the support spring which are loaded non-symmetrically and, therefore, have to undergo lower loads, have a smaller spring rate than areas of the support spring which are higher loaded.

BRIEF DESCRIPTION OF THE DRAWINGS

The present invention is explained more in detail with one embodiment together with the accompanying drawings.

DETAILED DESCRIPTION OF THE PREFERRED EMBODIMENT

Figure 1:
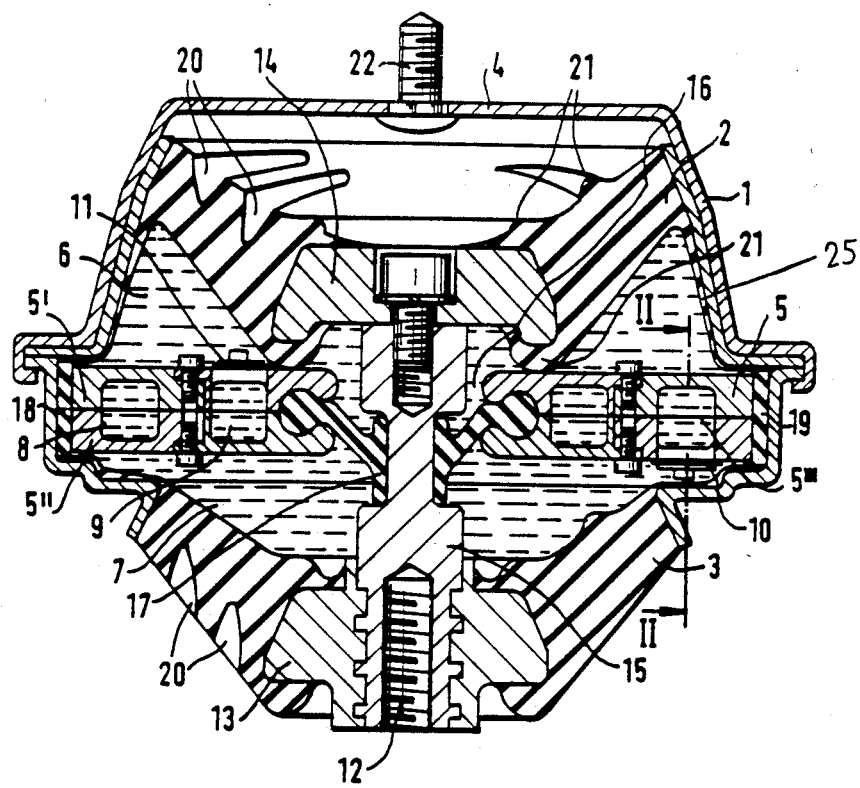
FIG. 1 is a cross-sectional view of a hydraulically damped elastomer-metal bearing according to the present invention.

In FIG. 1, there is shown axially sectioned a hydraulically damped elastomer-metal bearing according to the present invention. The illustrated bearing consists essentially of a bell-type housing 1, to which or in which, respectively, two mutually coaxial elastomer disc-type spring elements, which are truncated conical in cross-section and which are open in the same direction to the dome-type bottom 4 of the housing 1, are attached as support springs 2,3. The support springs 2,3 each have inner and outer concave surfaces with the inner concave surface of each spring 2, 3 facing towards the bottom 4 of the housing 1. Between these two support springs 2,3, a disc-type separating element 5 is fixed peripherally to the housing 1 in a liquid-tight manner, which disc-type separating element 5 defines together with the inner support spring 2 a working chamber 6 and together with the outer support spring 3 a working chamber 7.

Two throttling channels 8,9 formed like the arc of a circle are formed in the disc-type separating element 5. The working chambers 6,7 and the throttling channels 8,9 are filled with a damping liquid without any gas.

Figure 3:
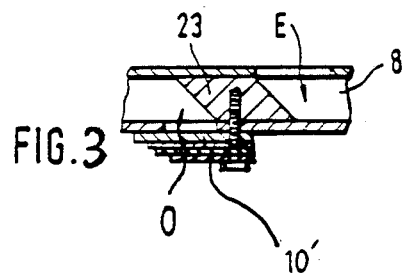
FIG. 3 is a cross-sectional view similar to FIG. 2 showing an alternative to the leaf spring arrangement illustrated in FIG. 2.

Each of the two hydraulically and entirely independent throttling channels 8,9 comprises an input opening E and an output opening O. With respect to the illustration of FIG. 1, the input opening E of the outer throttling channel 8 is at the side of the second working chamber 6, while the output opening O of that throttling channel 8 is at that side of the disc-type separating element 5, which is adjacent to the first working chamber 7. The output opening O is closed by a flat-type leaf spring 10, which is acting as a back valve. Alternatively, as seen in FIG. 3, the output opening O can be closed by a plurality of flap-type leaf springs 10' that act as a back valve. The second throttling channel 9 formed in the disc-type separating element 5, too, comprises a corresponding leaf spring acting as a back valve, which leaf spring 11, however, closes the output opening O of the inner throttling channel 9 at that side of the disc-type separating element 5, which is adjacent to the second working chamber 6, while the input opening E of this inner throttling channel 9 is formed on that side of the disc-type separating element 5, which is adjacent to the first working chamber 7. When the bearing is compressed by the load to be supported, the damping liquid inside the first working chamber 7 is compressed by the deformation of the support spring 3, and the hydraulic damping liquid of the first working chamber 7 passes through the input opening E, the inner throttling channel 9 and the output opening O comprising the back valve 11 to the second working chamber 6. At this time, no damping liquid can pass from the second working chamber 6 into the outer throttling channel 8, because this outer throttling channel 8 is closed by the back valve spring 10.

However, the outer throttling channel 8 is actuated when the bearing is unloaded because the decreasing volume of the second working chamber 6 hydraulic damping liquid is pressed from this second working chamber 6 through the throttling channel 8 back to the first working chamber 7, whereat the back valve 10 opens, while the back valve 11 closes.

Furthermore, the bearing illustrated in FIG. 1 comprises centrally and axially a first load coupling element 22 for the load to be supported and a second load coupling element 12, which first load coupling element 22 is fixed to the housing 1, while the second load coupling element 12 is formed in a metal core 13, which is vulcanized to the outer support spring 3. A corresponding centrally extending metal core 14 is vulcanized centrally to the inner support spring 2. By means of these two cores 13,14 of the spring elements, the two support springs 2,3 of the bearing are connected rigidly by a centrally extending bolt or coupling element 15. For that purpose, the disc-type separating element 5 comprises a central opening 16, through which opening the centrally extending coupling element 15 is projecting. The central opening 16 is hermetically closed by an elastomer diaphragm 17 to ensure the hermetical hydraulic separation of the first working chamber 7 and the second working chamber 6. This elastomer diaphragm 17 is intersected centrally, hermetically and in a liquid-tighten manner by the coupling element 15, which connects the two support springs rigidly.

The peripheral edge of the disc-type separating element 5 is fixed in a U-type annular groove 18 formed in the housing 1 and open radially inwards. An elastomer coating layer 19 is provided between the fixing area of the housing and the edge of the disc-type separating element 5, is circularly closed and insulates acoustically the disc-type separating element 5 from the housing 1. To achieve the same effect in the area of the second working chamber 6 for the hydraulic damping liquid, too, the whole inner wall of the housing of the bearing is coated with an elastomer layer 25 in areas which are at the same time a part of the first working chamber, which elastomer layer is preferably formed unitarily with the inner support spring 2 by vulcanizing.

Figure 2:
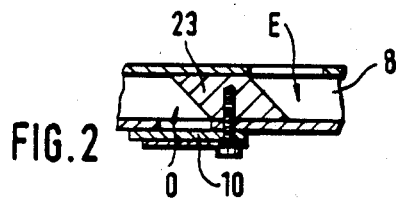
FIG. 2 is a cross-sectional view along the sectional line II—II in FIG. 1.

The disc-type separating element 5 consists of two parts, which two parts 5',5" comprise a central separating plane 5''', which is extending parallel to the main plain of the disc-type separating element 5. Both parts 5',5" of the disc-type separating element 5 comprise complementary U-type annular grooves, which are open towards the separating plane 5''' and which form the two hydraulic independent annular channels or throttling channels 8,9 when the two parts are brought together. The input side and the output side of these channels are separated by a separating element 23, which is fixed in principally any way, for example, as illustrated in FIG. 2, by a removable screw connection, to one of the two parts of the disc-type separating element 5.

The throttling characteristics of the channels can be changed and adjusted to special requirements by simply displacing these separating elements 23 and/or by angularly twisting the two parts of the disc-type separating element 5 relative to each other.

The elastomer support springs of the embodiment shown in FIG. 1 comprise arc-type grooves or recesses 20, which are open axially outwards, to vary the spring rate of different areas of the support springs and compensate different loads from different directions. These local weakened areas of the support springs enable a uniform distribution of the loads to be supported acting onto the support spring, even when these loads are acting non-symmetrically to the bearing.

End stop knobs or annular end stop reinforcements 21, respectively, prevent that the bearing from striking the housing undamped, when the bearing is in its extreme axial position.

We claim:

1. A hydraulically damped bearing comprising:
    a housing having a bottom portion and an inner surface and including a centrally located and axially extending first load coupling element for supporting a load;
    an inner disc-type elastomer support spring positioned at least partially within said housing and having a truncated conical cross-section defining inner and outer concave surfaces;
    an outer disc-type elastomer support spring positioned at least partially within said housing and having a truncated conical cross-section defining inner and outer concave surfaces, said inner support spring and said outer support spring being coaxial with respect to one another and being positioned with respect to said housing such that the inner concave surface of said inner support spring and the inner concave surface of said outer support spring both face towards the bottom of said housing; and
    a disc-type separating element attached to the inner surface of said housing in a liquid-tight manner, said separating element being positioned between said inner and outer support springs to thereby define a first working chamber between the inner concave surface of said outer support spring and the separating element and a second working chamber between the outer concave surface of said inner support spring and the separating element, said first and second working chambers being filled with a damping liquid, said outer support spring having a centrally located and axially extending second load coupling element attached thereto, said separating element having two separate channels located therein, each of the channels being adapted to be communicated with said first and second working chambers and each of the channels having a back valve positioned therein, the back valve in each channel being openable in different directions and each back valve being separately closable whereby, when the bearing is loaded, the damping liquid is forced from the first working chamber to the second working chamber as a result of an increase in pressure in the first working chamber which presses the damping liquid through one of the channels to thereby open the back valve associated with that channel, and when the bearing is unloaded, the damping liquid is forced from the second working chamber to the first working chamber as a result of an increase in pressure in the second working chamber which presses the damping liquid through the other channel to thereby open the back valve associated with that channel.

2. A bearing in accordance with claim 1, further comprising a rigid coupling element that extends between the inner and outer support springs to thereby connect said inner and outer support springs.

3. A bearing in accordance with claim 2, wherein said separating element has a centrally located hole extending therethrough, said hole having an elastic diaphragm extending thereacross and said elastic diaphragm having a hole located therethrough through which said rigid coupling element extends.

4. A bearing in accordance with claim 3, wherein the back valve associated with one of said channels provides relatively lesser flow resistance to the damping liquid while the back valve associated with the other channel provides relatively greater flow resistance to the damping liquid so that when a load is applied to the bearing, damping fluid flows relatively easily through the one channel and the associated back valve whereas when the load is removed from the bearing, the flow of damping fluid through the other channel and the associated back valve is throttled.

5. A bearing according to claim 4, wherein at least a portion of the inner surface of said housing is coated with an elastomer layer.

6. A bearing in accordance with claim 5, wherein said inner and outer elastomer support springs have non-symmetrically arranged recesses located therein for varying the spring rate of different areas of the inner and outer elastomer support springs.

7. A bearing according to claim 6, wherein each of said back valves comprises at least one leaf spring attached to said separating element and covering an output opening in said separating element.

8. A bearing according to claim 7, wherein each of said back valves comprises a plurality of leaf springs.

9. A bearing according to claim 2, wherein said separating element lies in a plane and has a central axis and wherein said separating element is comprised of two parts that are separable from each other along a plane intersecting the channels and extending in a direction parallel to the plane of the separating element, whereby the lengths of the channels in the separating element can be varied by rotating the two parts of the separating element relative to each other about the central axis of the separating element.

10. A bearing according to claim 1, wherein the back valve associated with one of said channels provides relatively lesser flow resistance to the damping liquid while the back valve associated with the other channel provides relatively greater flow resistance to the damping liquid so that when a load is applied to the bearing, damping fluid flows relatively easily through the one channel and the associated back valve whereas when the load is removed from the bearing, the flow of damping fluid through the other channel and the associated back valve is throttled.

11. A bearing according to claim 1, wherein at least a portion of the inner surface of said housing is coated with an elastomer layer.

12. A bearing according to claim 1, wherein each of said back valves comprises at least one leaf spring attached to said separating element and covering an output opening in said separating element.

13. A bearing according to claim 12, wherein each of said back valves comprises a plurality of leaf springs.

14. A bearing according to claim 1, wherein said separating element lies in a plane and has a central axis and wherein said separating element is comprised of two parts that are separable from each other along a plane intersecting the channels and extending in a direction parallel to the plane of the separating element, whereby the lengths of the channels in the separating element can be varied by rotating the two parts of the separating element relative to each other about the central axis of the separating element.

15. A bearing in accordance with claim 14, wherein each of said two parts has two U-shaped grooves located therein that define a portion of said channels.

16. A bearing in accordance with claim 1, wherein said inner and outer elastomer support springs have non-symmetrically arranged recesses located therein for varying the spring rate of different areas of the inner and outer elastomer support springs.

17. A hydraulically damped bearing comprising:
a housing having a bottom portion and an inner surface;
an inner disc-type elastomer support spring positioned at least partially within said housing and having an inner surface facing towards the bottom of said housing and an outer surface facing away from the bottom of the housing;
an outer disc-type elastomer support spring positioned at least partially within said housing and having an inner surface facing towards the bottom of said housing and an outer surface facing away from the bottom of said housing, said inner and outer support springs being coaxial with respect to each other; and
a disc-type separating element attached to the inner surface of said housing in a liquid-tight manner, said separating element being positioned between said inner and outer support springs to thereby define a first working chamber between the inner surface of said outer support spring and the separating element and a second working chamber between the outer surface of said inner support spring and the separating element, said first and second working chambers being filled with a damping liquid, said separating element having two separate channels located therein and each of the channels having an input opening and an output opening therein for communicating the first working chamber with the second working chamber, the output opening in each channel including a back valve wherein the back valve in one output opening is openable in a direction different from the back valve in the other output opening and wherein the back valve in each output opening is separately closable with respect to the back valve in the other output opening whereby, when the bearing is loaded, the damping liquid is forced from the first working chamber to the second working chamber as a result of an increase in pressure in the first working chamber which presses the damping liquid through one of the channels to thereby open the back valve associated with that channel, and when the bearing is unloaded, the damping liquid is forced from the second working chamber to the first working chamber as a result of an increase in pressure in the second working chamber which presses the damping liquid through the other channel to thereby open the back valve associated with that channel.

18. A bearing in accordance with claim 17, further comprising a rigid coupling element that extends between and connects said inner and outer support springs.

19. A bearing in accordance with claim 18, wherein said separating element has a centrally located hole extending therethrough, said hole having an elastic diaphragm extending thereacross and said elastic diaphragm having a hole located therethrough through which said rigid coupling element extends.

20. A bearing in accordance with claim 17, wherein each of said back valves comprises at least one leaf spring.

* * * * *